(12) United States Patent
Klemenz et al.

(10) Patent No.: US 10,747,736 B2
(45) Date of Patent: Aug. 18, 2020

(54) AGGREGATION DATABASE FOR EXTERNAL DATASET

(71) Applicant: SAP SE, Walldorf (DE)

(72) Inventors: Oliver Klemenz, Sinsheim (DE); Uwe Schulz, Walldorf (DE)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 15/335,254

(22) Filed: Nov. 9, 2016

(65) Prior Publication Data

US 2018/0129689 A1   May 10, 2018

(51) Int. Cl.
  *G06F 16/00*   (2019.01)
  *G06F 16/22*   (2019.01)
  *G06F 16/28*   (2019.01)

(52) U.S. Cl.
  CPC ............ *G06F 16/22* (2019.01); *G06F 16/283* (2019.01)

(58) Field of Classification Search
  CPC ......... G06F 17/30592; G06F 17/30477; G06F 16/284; G06F 16/283; G06F 16/2455; G06F 16/285
  USPC .................................................. 707/600–899
  See application file for complete search history.

(56) References Cited

U.S. PATENT DOCUMENTS

| | | | | |
|---|---|---|---|---|
| 7,249,136 B1 * | 7/2007 | Muthukrishnan | ..... | G06F 16/283 707/756 |
| 7,571,182 B1 * | 8/2009 | Eddy | ..... | G06F 16/283 |
| 8,386,916 B2 * | 2/2013 | Le Brazidec | ........... | G06F 40/18 715/219 |
| 2002/0103807 A1 * | 8/2002 | Yamashita | ............. | G06F 16/283 |
| 2002/0184187 A1 * | 12/2002 | Bakalash | .......... | G06F 17/30457 |
| 2006/0156967 A1 * | 7/2006 | You | ........................ | G06Q 30/02 116/4 |
| 2008/0059415 A1 * | 3/2008 | Bakalash | .......... | G06F 17/30489 |
| 2009/0222552 A1 * | 9/2009 | Chroscielewski | .. | G06F 11/3438 709/224 |
| 2009/0327339 A1 * | 12/2009 | Berger | ............. | G06F 17/30592 |
| 2010/0185581 A1 * | 7/2010 | Bakalash | .......... | G06F 17/30489 707/602 |
| 2012/0173476 A1 * | 7/2012 | Rizvi | .................. | G06F 16/2465 707/601 |
| 2012/0323947 A1 * | 12/2012 | Bice | .................. | G06F 16/24522 707/760 |
| 2013/0239036 A1 * | 9/2013 | MacDonald | .......... | G06F 16/283 715/769 |
| 2013/0282650 A1 * | 10/2013 | Zhang | .................. | G06F 16/283 707/605 |
| 2015/0186529 A1 * | 7/2015 | Rope | ...................... | G06Q 10/00 707/722 |
| 2016/0335318 A1 * | 11/2016 | Gerweck | ............. | G06F 16/2282 |

(Continued)

*Primary Examiner* — Michelle N Owyang
(74) *Attorney, Agent, or Firm* — Fountainhead Law Group P.C.

(57) ABSTRACT

A database system for representing data in an external dataset may include a multidimensional database defined by a set of dimensions associated with a respective set of attributes of the data in the external dataset. The multidimensional database may include a set of cells partitioned or otherwise divided into a set of slots. Each slot may be associated with a set of attribute values of the attribute associated with its corresponding dimension. Each cell may store data from the external dataset accessed by aggregating sets of attribute values associated with respective slots of the dimensions of the multidimensional database that define the cell.

20 Claims, 9 Drawing Sheets

(56) References Cited

U.S. PATENT DOCUMENTS

2017/0116032 A1* 4/2017 Tran ................... G06F 9/5061
2017/0116228 A1* 4/2017 Alberg ................ G06F 16/211
2017/0286497 A1* 10/2017 Crabtree ............. H04L 67/12

* cited by examiner

AGGREGATION DATABASE FOR EXTERNAL DATASET

BACKGROUND

In many situations, a database application needs to rely on external data that is provided outside of the primary application persistence, for example, data from an external data provider. Examples include:

Product data
Ratings
Price-calculations
Address data
Geo-location

If the application needs live access to this external data, the overall responsiveness for the end user can dramatically decrease, as the performance of the system becomes tightly coupled to the response times of the external data provider. Often, external data providers do not have all the data already in place and pre-calculated, but instead need to build up the dataset on-the-fly, for example by triggering additional calls to other (external or internal) data providers.

These external systems my be old legacy systems, which do not leverage state-of-the art database technologies. Request can take many seconds (up to minutes), which may be unacceptable to the end user for some online application scenarios. Consequently, these systems may not always fulfill the requirements for a given application, especially when the load on the system is very high, or in a consumer application scenario where many thousands of user access the service in parallel. The following key performance indicators may be important considerations when building such systems:

Single user end-to-end response time
Number of parallel users/requests

One approach to overcome this situation is to replicate the external data into the enterprise running the database application. However, certain challenges present themselves with regard to the external data:

Magnitude of the data:
  How big is the set of external data?
  Can it be replicated completely?
  Does it contain variable content, for example calculations?
Up-to-date-ness:
  How often does the external data change?
  Which percentage of the data changes in which timeframe?
  How long does it take to update the complete dataset?
Legal perspective:
  Can the data be replicated from a legal perspective?
  Can the data be replicated from a privacy protection perspective?

SUMMARY

In accordance with embodiments of the present disclosure, a method for representing an external dataset in a database system may include providing a multidimensional database defined by several dimensions associated with respective attributes of the data in the external dataset. The multidimensional database may comprise cells defined by a partitioning of each of the dimensions into slots. For each of the dimensions, the method may include associating each slot along that dimension with a set of attribute values of the attribute associated with that dimension. For each given cell in the multidimensional database, the method may include aggregating sets of attribute values associated with respective slots along the dimensions that define the given cell using respective aggregation operations to produce aggregated attribute values that correspond to those sets of attribute values, and accessing the external dataset using the aggregated attribute values to query the external dataset. Data returned from the query may be stored into the given cell.

In some embodiments, the method may further include aggregating each set of attribute values according to an aggregation operation to produce a corresponding aggregated attribute value. Attributes in one dimension may be aggregated according to an aggregation operation different from attributes in another dimension.

In some embodiments, the step of accessing may include making a single query to the external dataset, using the aggregated attribute values as parameters of the single query and receiving a response to the single query that comprises data for the given cell.

In some embodiments, each slot along a given dimension may be associated with a range of attribute values of the attribute associated with the given dimension. The range of attribute values of each slot along the given dimension may span the same or a different number of attribute values as other slots along the given dimension.

In some embodiments, each slot along a given dimension may be associated with an enumeration of attribute values of the attribute associated with the given dimension. The number of attributes enumerated may be the same or different than other slots along the given dimension.

In accordance with embodiments of the present disclosure, a system may include a processing unit and a memory. A storage unit may have stored thereon a multidimensional database defined by several dimensions associated with respective attributes of the data in the external dataset. The multidimensional database may comprise cells defined by a partitioning of each of the dimensions into slots. For each of dimension, each slot along that dimension may be associated with a set of attribute values of the attribute associated with that dimension.

Program code stored in the memory may comprise executable instructions which, when executed by the processing unit, cause the processing unit to associate each slot along that dimension with a set of attribute values of the attribute associated with that dimension (for each dimension). For each given cell in the multidimensional database, sets of attribute values associated with respective slots along the dimensions that define the given cell may be aggregated using respective aggregation operations to produce aggregated attribute values corresponding to the sets of attribute values. The external dataset may be accessed using the aggregated attribute values to obtain data from the external dataset, which may be stored into the given cell.

In accordance with embodiments of the present disclosure, a non-transitory computer readable storage medium having stored thereon computer executable program code which, when executed by a computer, cause the computer to store a multidimensional database on a storage device, the multidimensional database may be defined by several dimensions associated with respective attributes of the data in the external dataset, the multidimensional database may comprising cells defined by a partitioning of each of the dimensions into slots.

For each of the dimensions, each slot along that dimension may be associated with a set of attribute values of the attribute associated with that dimension. For each given cell in the multidimensional database, sets of attribute values associated with respective slots along the dimensions that define the given cell may be aggregated using respective aggregation operations to produce aggregated attribute values corresponding to the sets of attribute values. The external dataset may be accessed using the aggregated attribute values to obtain data from the external dataset and store the data into the given cell.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
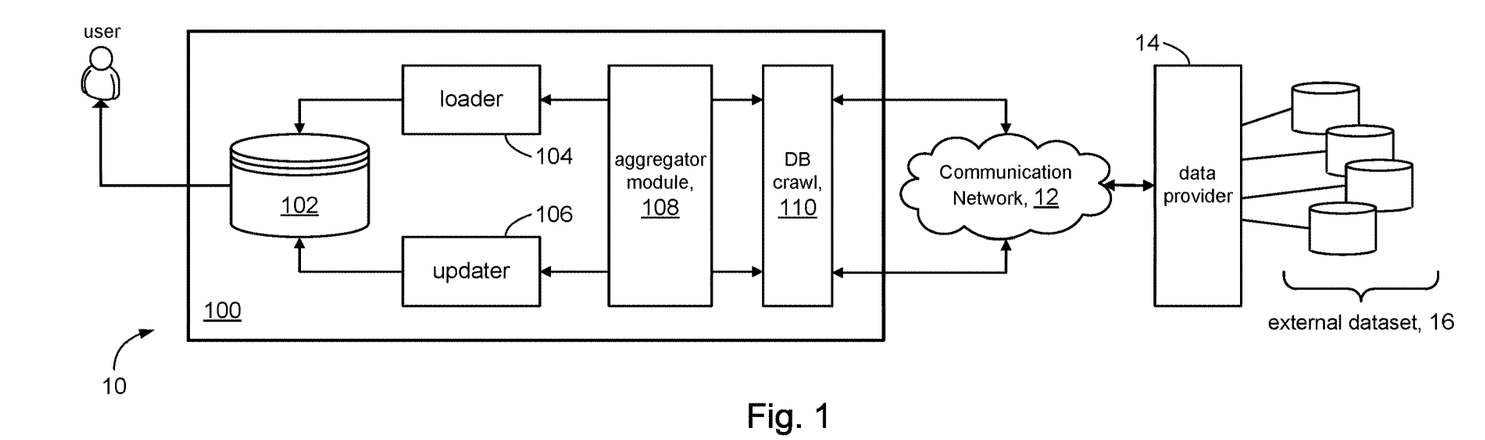
FIG. 1 illustrates an enterprise having a multidimensional database in accordance with the present disclosure.

FIG. 1 shows a database system 100 (e.g., in an enterprise 10) in accordance with some embodiments of the present disclosure. The database system 100 may include a multidimensional database 102. The multidimensional database 102 may represent data obtained from an external dataset 16 and data that is derived (computed) from data comprising the external dataset 16. In some embodiments, the external dataset 16 may be external to the enterprise 10. In other embodiments, the external dataset 16 may include data from data providers (not shown) within the enterprise 10.

The database system 100 may include a loader module 104. The loader module 104 may communicate with an aggregator module 108. In accordance with the present disclosure, the aggregator module 108 may aggregate attribute values of attributes in the external dataset 16 and manage the aggregated attribute values. The aggregated attribute values may be used to query the external dataset 16 to obtain data that is representative of the aggregated attribute values, and is referred to herein as "aggregated" data. This aspect of the present disclosure is discussed in more detail below. The loader module 104 may access the external dataset 16 via the aggregator module 108 to perform an initial load of the multidimensional database 102 using the aggregated attribute values managed in the aggregator module 108.

The database system 100 may include an updater module 106. After an initial loading of the multidimensional database 102 (e.g., via loader module 104), the multidimensional database 102 may be periodically updated in order to keep the multidimensional database 102 up-to-date with changes that may occur in the external dataset 16. Accordingly, the updater module 106 may communicate with the aggregator module 108 to access the external dataset 16 using the same aggregated attribute values in a manner similar to the manner described for loader module 104.

The database system 100 may include a database crawler 110. The database crawler 110 may systematically access the data that comprise the external dataset 16. The loader module 104, in conjunction with the aggregator module 108, may coordinate the activities of the database crawler 110 to conduct an initial loading of the multidimensional database 102. Similarly, the updater module 106 in conjunction with the aggregator module 108 may coordinate with the database crawler 110 to perform periodic or otherwise scheduled updates on the multidimensional database 102.

The database crawler 110 may communicate over a suitable communication network 12 to access the external dataset 16. The communication network 12 may include some combination of local area networks and/or wide area networks within the enterprise 10, public communication networks (e.g., the Internet), and so on.

In some embodiments, the external dataset 16 may be accessed via a single data provider 14 (FIG. 1). Merely as an example to illustrate this point, suppose the database system 100 assists customers in identifying financial data, insurance data, and portfolio management data that best suits their living conditions and financial situation. The external dataset 16 may comprise banking data (e.g., mortgage rates, savings plans, etc.), insurance data, and financial investment data. These individual collections of data may be accessed through a single data provider 14.

Figure 1A:
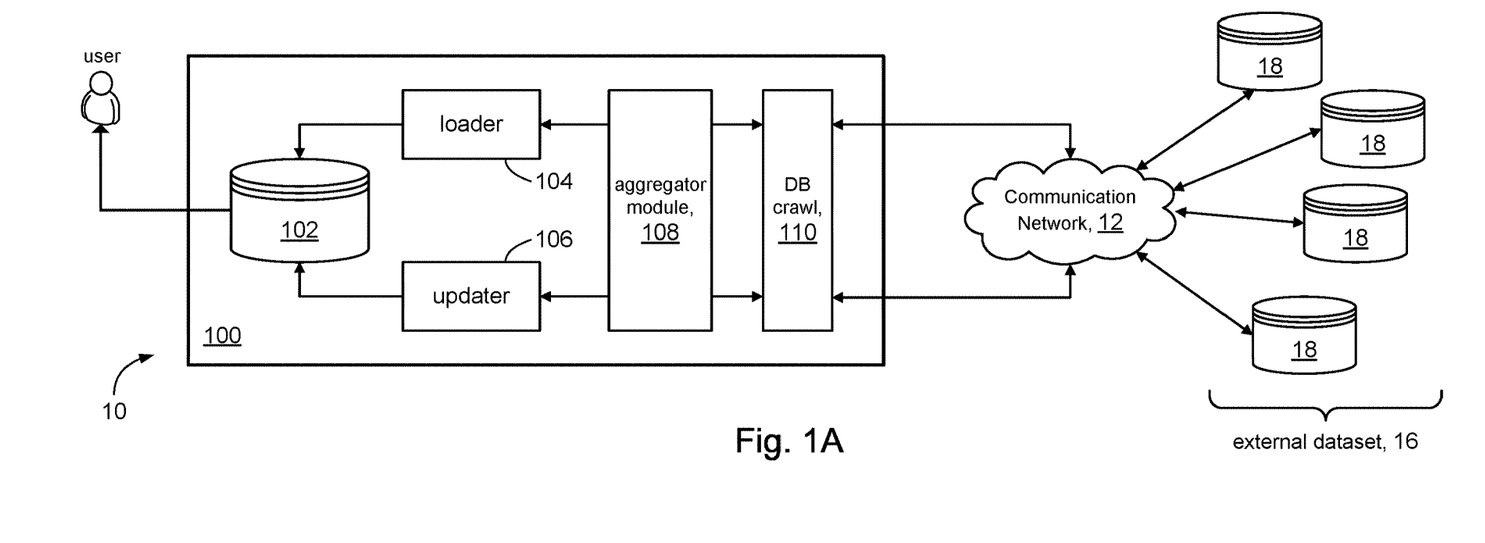
FIG. 1A illustrates an alternative configuration of an enterprise having a multidimensional database in accordance with the present disclosure.

On the other hand the external dataset 16 may comprise data from independent data providers 18, such as shown in FIG. 1A. Merely as an example to illustrate this point, suppose the database system 100 provides customers with comparisons of insurance rates between different insurance carriers. The external dataset 16 may comprise insurance premiums and related data from the different insurance carriers. However, instead of a single portal to the data, the insurance carriers may serves as separate data providers 18 to their respective insurance data. Going forward, the discussion will assume access to the external dataset 16 is via data provider 14 without loss of generality, and with the understanding that the disclosure is applicable to any configuration of the external dataset 16 whether accessed by a single data provider 14 or several data providers 18.

In addition to providing access to the external dataset 16, the data provider 14 may provide data that requires a compilation of data comprising the external dataset 16 and/or computations or analytics on data comprising the external dataset 16. For example, a provider of financial data, on the one hand, may provide the stock market data such as opening and closing prices, highs and lows, and so on. Such day can be a simple look up in a in the external dataset 16. On the other hand, the provider of financial data may have to collect stock market data and perform certain analytics in order to provide a projection of future performance on the stock.

The data that comprise the external dataset 16 may be characterized by their attributes. Merely to illustrate this point, consider as an example automobile insurance data, which may be characterized by several attributes such as: address (city, state, etc.) of the insured, age, profession, distance to work, automobile information (make, model, mileage, etc.), and so on. The data that comprise the external dataset 16 may be logically viewed as a multidimensional dataset. Each dimension of the multidimensional dataset may be associated with an attribute. Using the insurance example above, the automobile insurance data may be viewed as a multidimensional dataset. The "city" attribute may be a dimension in the multidimensional dataset, the "state" attribute may be another dimension in the multidimensional dataset, the "age" attribute may be another dimension, the "profession" attribute another dimension, and so on for each attribute.

Figure 2:
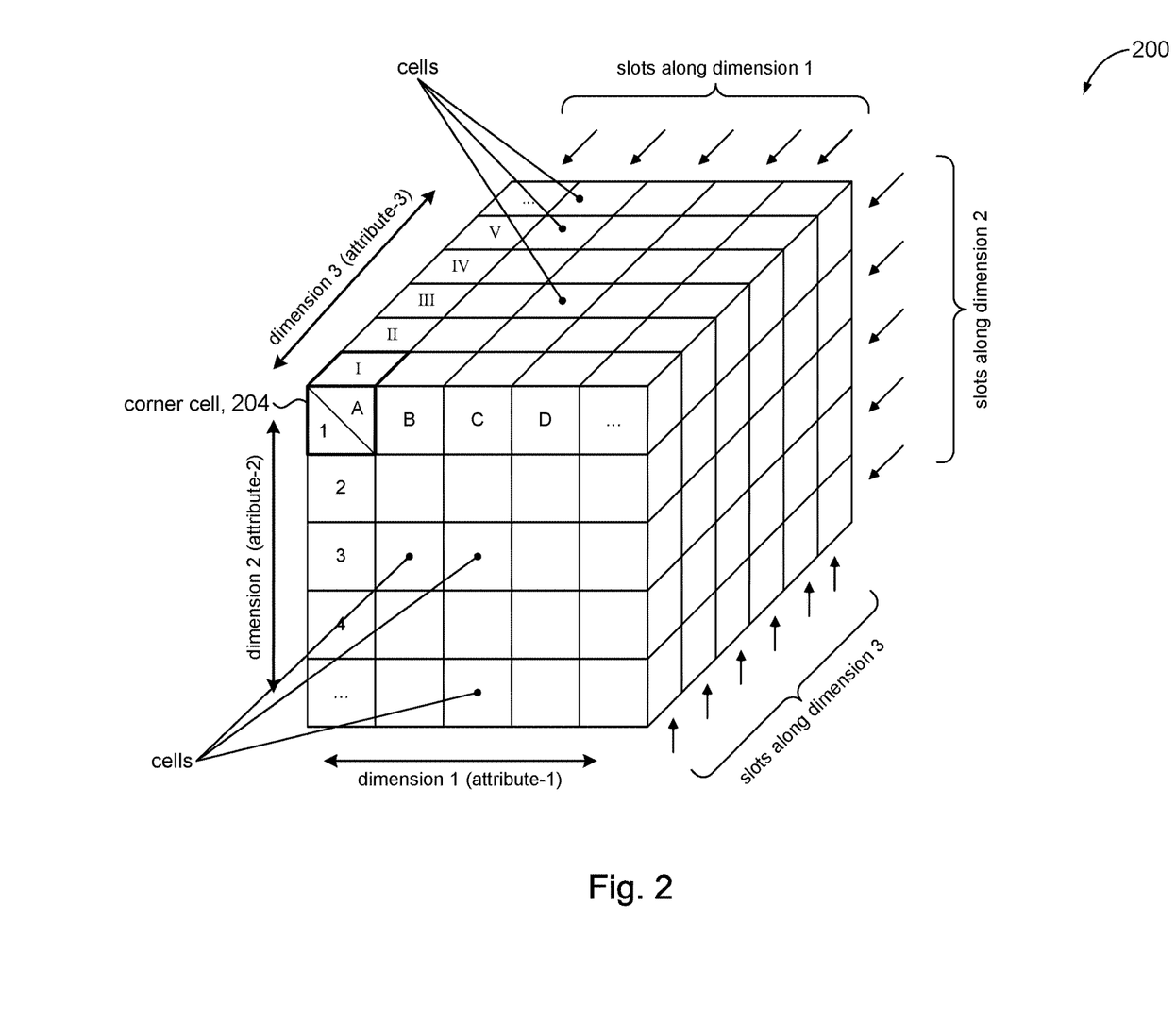
FIG. 2 is a logical representation of an external dataset in accordance with the present disclosure.

Referring to FIG. 2, the external dataset 16 may be graphically represented as a cube or matrix. For illustration purposes, we can assume without loss of generality that the external dataset 16 can be characterized or otherwise represented by three relevant attributes, with the understanding that the discussion can be readily extended to an external dataset having any number N of relevant attributes. The external dataset 16 may be logically viewed (represented) as a multidimensional dataset of N dimensions. Accordingly, an external dataset characterized by three attributes may be represented by a cube, such as shown in FIG. 2. It will be appreciated that an external dataset characterized by N attributes may be logically represented as an N-dimensional hypercube.

The three-dimensional dataset 200 of FIG. 2 logically represents an external dataset 16 characterized by three attributes. The three-dimensional dataset 200 may be defined by three dimensions associated respectively with three attributes from the external dataset 16; each dimension may be associated with a respective attribute. Thus, for example, dimension 1 may be associated with attribute-1 (e.g., "job title") of the external dataset 16, dimension 2 may be associated with attribute-2 (e.g., "age") of the external dataset 16, and dimension 3 may be associated with attribute-3 (e.g., "income range") of the external dataset 16.

Each dimension (e.g., dimension 1) may be partitioned or otherwise divided into several slots (or intervals, increments, etc.). Each slot along a dimension may be associated with an attribute value of the attribute associated with that dimension; e.g., suppose the attribute is "city," then examples of attribute values for "city" may include Boston, Chicago, Waldorf, Munich, Tokyo, Shanghai, and the like. Each slot along dimension 1 may be associated with an attribute value of attribute-1 (the attribute associated with dimension 1), and similarly for slots along dimension 2 and slots along dimension 3. Referring to the example in FIG. 2, the attribute values for attribute-1 include A, B, C, D. Thus, the attribute value A may be associated with a slot along dimension 1, the attribute value B may be associated with another slot along dimension 1, the attribute value C may be associated with another slot along dimension 1, and so on. Similarly for attribute-2 (with attribute values that include 1, 2, 3, 4), and attribute-3 (with attribute values that include I, II, III, IV, V).

The three-dimensional dataset 200 defines a set of cells. Each cell may be referenced or otherwise addressed by its slot position along each dimension. For example, FIG. 2 shows a cell 202 that is referenced by the slot along dimension 1 that is associated with the attribute value D (attribute-1), the slot along dimension 2 that is associated with the attribute value 3 (attribute-2), and the slot along dimension 3 that is associated with the attribute value 1 (attribute-3). A corner cell 204 is likewise referenced by the attribute value A along dimension 1, the attribute value 1 along dimension 2, and the attribute value I along dimension 3.

The data (cell data) in each cell may represent data in the external dataset 16 that is identified by the attributes values associated with the respective slots along the dimensions that define that cell. Merely to illustrate this point, consider the illustrative example shown in FIG. 2A. Using the automobile insurance data example above, suppose attribute-1 is the "city" attribute, attribute-2 is the "age" attribute, and attribute-3 is the "profession" attribute. Suppose further that cell 202 is identified by the following attribute values: attribute-1=Chicago, attribute-2=32, attribute-3=Manager. The data in cell 202 may then represent information about insured 32 year old people who live in Chicago and are managers. The data may be a single value (e.g., annual premium), or may be a structure of data comprising several data elements.

Figure 2A:
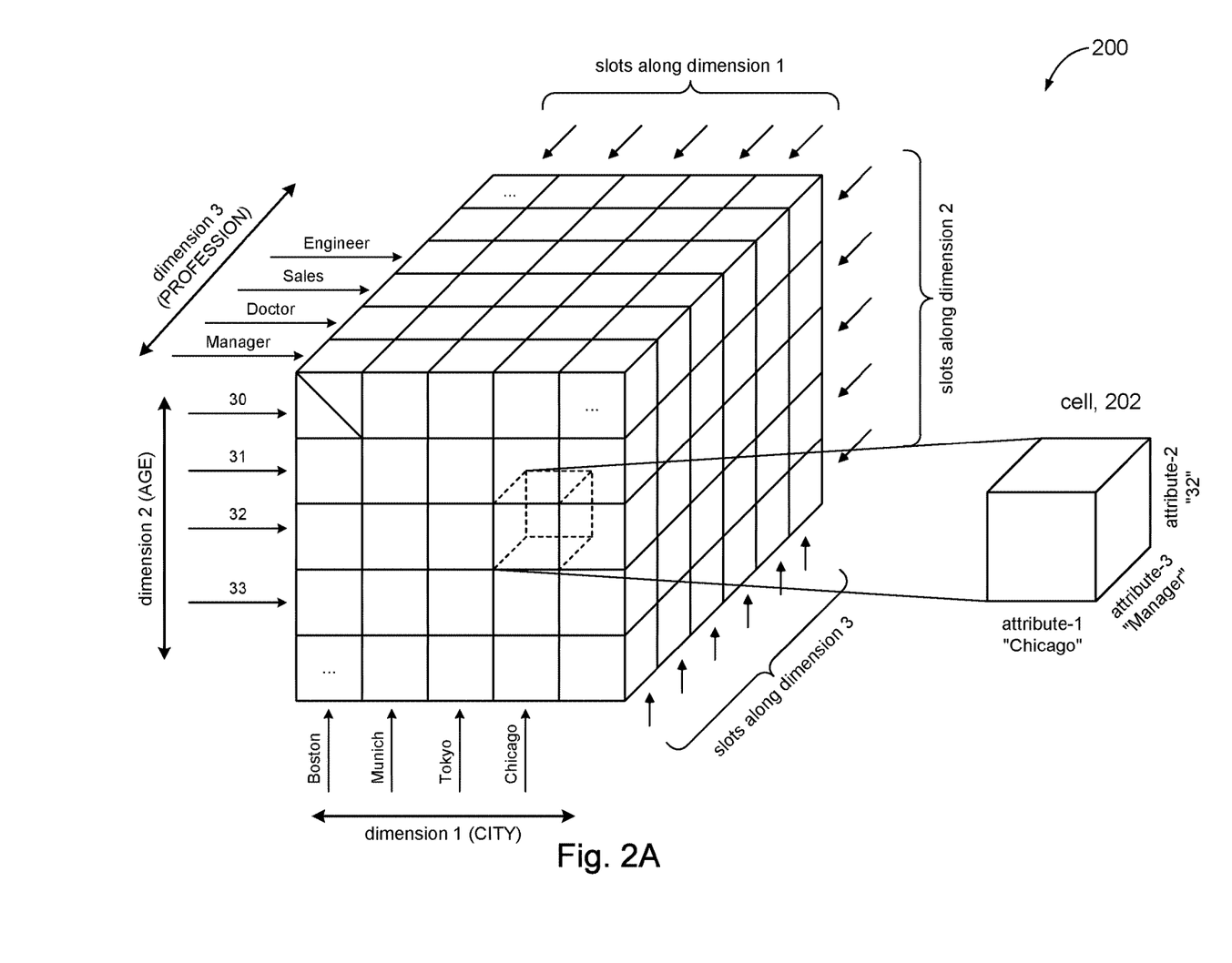
FIG. 2A is an illustrative example of the logical representation of an external dataset in accordance with the present disclosure.

Based on the example shown in FIG. 2A, it can be appreciated that the dataset 200 can be very large. Accordingly, it may not be practical to store the entirety of an external dataset 16 when the external dataset 16 may be characterized by 10's, 100's or more attributes, and each attribute may take on a large range of attribute values. The size or amount of data comprising the external dataset 16 can exceed the storage capacity of a practical multidimensional database 102.

Figure 3:
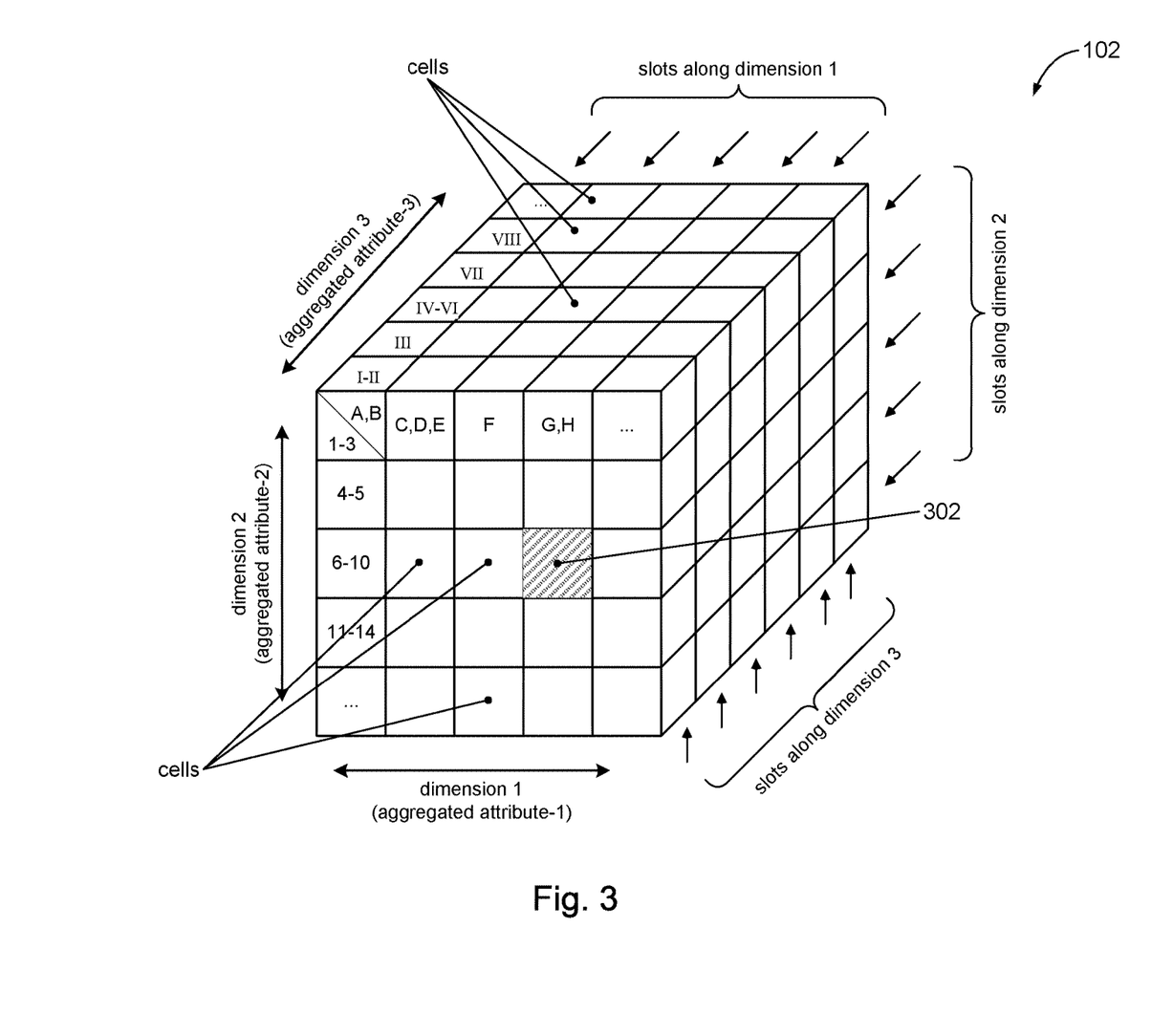
FIG. 3 is an illustrative example of a multidimensional database in accordance with the present disclosure.

Referring to FIG. 3, the discussion will now turn to a description of how an external dataset 16 may be represented in a multidimensional database 102 (FIG. 1) in accordance with the present disclosure. In accordance with the present disclosure, the slots defined along the dimensions of the multidimensional database 102 may represent aggregations (sets) of attribute values of the attributes respectively associated with those dimensions. In other words, each slot along a given dimension of the multidimensional database 102 may be associated with a set of attribute values of the attribute associated with that dimension. Merely to illustrate this point, consider for example dimension 1, associated with attribute-1. The slots along dimension 1 are not necessarily associated with respective single attribute values of attribute-1 (as depicted in FIG. 2, for example), but rather may be associated with sets of attribute values of attribute-1. For example, the first slot along dimension 1 is associated with the set of attribute values {A,B}. The next slot along dimension 1 is associated with the set of attribute values {C, D,E}, and so on. Some slots may be associated with a single attribute value; e.g., the third slot along dimension 1 is associated with the single attribute value F. Slots along the other dimensions of the multidimensional database 102 may be defined in similar fashion. Thus, for example, the first slot along dimension 2 is associated with the set of attribute values {1-3} The next slot along dimension 2 is associated with the set of attribute values {4-5}, and so on.

Sets of attribute values assigned to the slots along a given dimension may be aggregated (grouped together) in any suitable way. Some attribute values may be grouped by enumeration. The attribute values associated with the slots along dimension 1 shown in FIG. 3, for example, represent an example of enumerated sets of attribute values. Some attribute values may be grouped by ranges. The attribute values associated with the slots along dimension 2, for example, sets of attribute values expresses as ranges. Other groupings may be used. The nature of the attribute values may dictate what is a suitable grouping. For example, if the attribute is "city" then the attribute values may be city names, such as Boston, Chicago, Waldorf, Munich, Tokyo, Shanghai, and so on. In that case, the attribute values for "city" may be grouped by enumeration, such as {Boston, Chicago}, {Waldorf, Munich, Tokyo}, and so on. If the attribute is "age," then the attribute values may be numeric values, and a suitable aggregation may be to group the attribute values for "age" according to age ranges such as {20-25}, {26-30}, {31-40}, and so on.

The number of attribute values that form a set may be the same for each slot along a given dimension. For example, each slot along a given dimension may enumerate the same number of attribute values (e.g., the following {a,s,d}, {f,h,y}, {k,l,w}, enumerate the same number of items) or may specify ranges that span the same number of attribute values (e.g., the ranged sets {1-6}, {7-12}, {13-18}, span the same number of values). In some embodiments, the number of attribute values that form a set vary from slot to slot. FIG. 3, for example, shows that the first slot along dimension 1 is associated with a set of attributes having two attribute values {A,B} while the second slot along dimension 1 is associated with a set of attributes having three attribute values {C,D,E}.

In accordance with the present disclosure, the data in each cell (cell data) may be identified according to the sets of attribute values respectively associated with the slots along the dimensions that define that cell. The cell data may be deemed to be representative of the groupings of attributes values associated with the cell. To better understand this aspect of the present disclosure, consider the cells in the multidimensional database 102 shown in FIG. 3. The cells are defined by respective slots along dimension 1, dimension 2, and dimension 3. As described above, each slot along each dimension is associated with a set of attribute values. Cell 302 for example is defined by slots along dimension 1, dimension 2, and dimension 3. More specifically, cell 302 is defined by the following sets of attribute values associated with those slots: {G,H} (set of attribute values associated with the slot along the attribute-1 dimension), {6-9} (set of attribute values associated with the slot along the attribute-2 dimension), and {I-II} (set of attribute values associated with the slot along the attribute-3 dimension). The cell data in cell 302 may be deemed to be representative of the data in the external dataset 16 identified by those sets of attribute values.

Merely to illustrate this point with an example, assume the following specific instance of insurance data where attribute-1 is "city," attribute-2 is "age," and attribute-3 is "distance to work." Assume certain specific values for the aggregated attribute values associated with cell 302; for example, suppose the attribute values G,H are Rome, Mumbai, the attribute values 6-9 refer to the range 26-30, and the attribute values I-II refer to the range 10-20. In this specific example, the cell data stored in cell 302 may be deemed to be representative of insured persons who live in Rome or Mumbai, are between the ages of 26-30, and drive a distance from 10-20 miles to work.

In accordance with the present disclosure, the cell data for a given cell (e.g., cell 302) in the multidimensional database 102 may be accessed from the external dataset 16 using predetermined aggregation operations applied to the sets of aggregated attribute values associated with the slots that define the given cell to produce a corresponding aggregated attribute value for each set of attribute values. Note that the aggregation operation is performed on the attribute values, rather than on data obtained from the external dataset 16. Suppose, for example, an "age" attribute is divided into the following ranges: 20-25, 26-35, 36-39. An example of an aggregation operation is the AVERAGE operation, so that each range is averaged to produce a corresponding aggregated attribute value for each set of ranges. Thus, in the example, the range 20-25 may be averaged to produce the aggregated (averaged) attribute value 22.5, the range 25-35 may be averaged to produce the aggregated attribute value 30, and so on. Any suitable aggregation operation may be used, including but not limited to SUMMATION, AVERAGE, MAXIMUM, MINIMUM, FIRST, LAST, etc., to compute or otherwise generate an aggregated attribute value for a given set of attribute values.

Attributes along different dimensions may be processed using different aggregation operations. For example, the aggregation operation along dimension 1 may be the AVERAGE, operation, while the aggregation operation along dimension 1 may be the MAXIMUM, operation, and so on.

In accordance with the present disclosure, the cell data for a given cell may be determined by accessing the external dataset 16 using the aggregated attribute values associated with the given cell as query parameters in a query on the external dataset 16. Thus, for example, cell 302 in FIG. 3 is defined by the following three sets of attribute values {G,H}, {6-9}, and {I-II}. Cell 302 is associated with three aggregated attribute values, namely an aggregated attribute value produced by applying an aggregation operation on the set of attribute values {G,H}, an aggregated attribute value produced by applying an aggregation operation on {6-9}, and an aggregated attribute value produced by applying an aggregation operation on {I-II}.

By aggregating the attribute values instead of the raw data from the external dataset 16, the processing time for building, and subsequently keeping up to date, the multidimensional database 102 can be significantly reduced. On the one hand, for example, the cell data for a cell that is defined by three dimensions and represented by a range of x attributes values along the $1^{st}$ dimension, y attributes values along the $2^{nd}$ dimension, and z attributes values the a $3^{rd}$ dimension can require x×y×z accesses to the external dataset 16 to obtain the raw data to compute a representative value for the cell data. On the other hand, in accordance with the present disclosure, the x attributes values along the $1^{st}$ dimension may be aggregated (e.g., averaged, max'd, min'd, etc.) to produce a single aggregated attribute value. Similarly, they attributes values along the $2^{nd}$ dimension and can be aggregated to produce a single aggregated attribute value, and likewise for the z attributes values along the $3^{rd}$ dimension. Advantageously, a single query using these aggregated attribute values may then be issued to the external dataset 16 to access a value as the cell data for the given cell. The accessed value may be deemed to be representative of the x attributes values along the $1^{st}$ dimension, they attributes values along the $2^{nd}$ dimension, and the z attributes values along the $3^{rd}$ dimension that define the given cell.

Another advantageous aspect of a multidimensional database 102 in accordance with the present disclosure is that the data is pre-accessed from the external dataset 16. The external dataset 16 may not be directly accessible, but instead may require special interfaces or may only provide certain views of the data. Therefore delays or additional post processing of the data retrieved from the external dataset 16 (e.g., by the loader module 104 and updater module 106, FIG. 1) may be required to obtain the actual data of interest. This can be a time consuming process, resulting in unacceptable response times. In other instances, the data from the external dataset 16 may not be persistent, and may have to be computed or otherwise compiled on-the-fly at the time of access, which can also lead to unacceptable response times. Having the data pre-accessed (and pre-computed) from the external dataset 16 and stored in the multidimensional database 102 can provide near real-time response times for users of the multidimensional database 102. This can be especially relevant in a high load usage scenario where many users (100's to 1000's) may concurrently access the multidimensional database 102.

Figure 4:
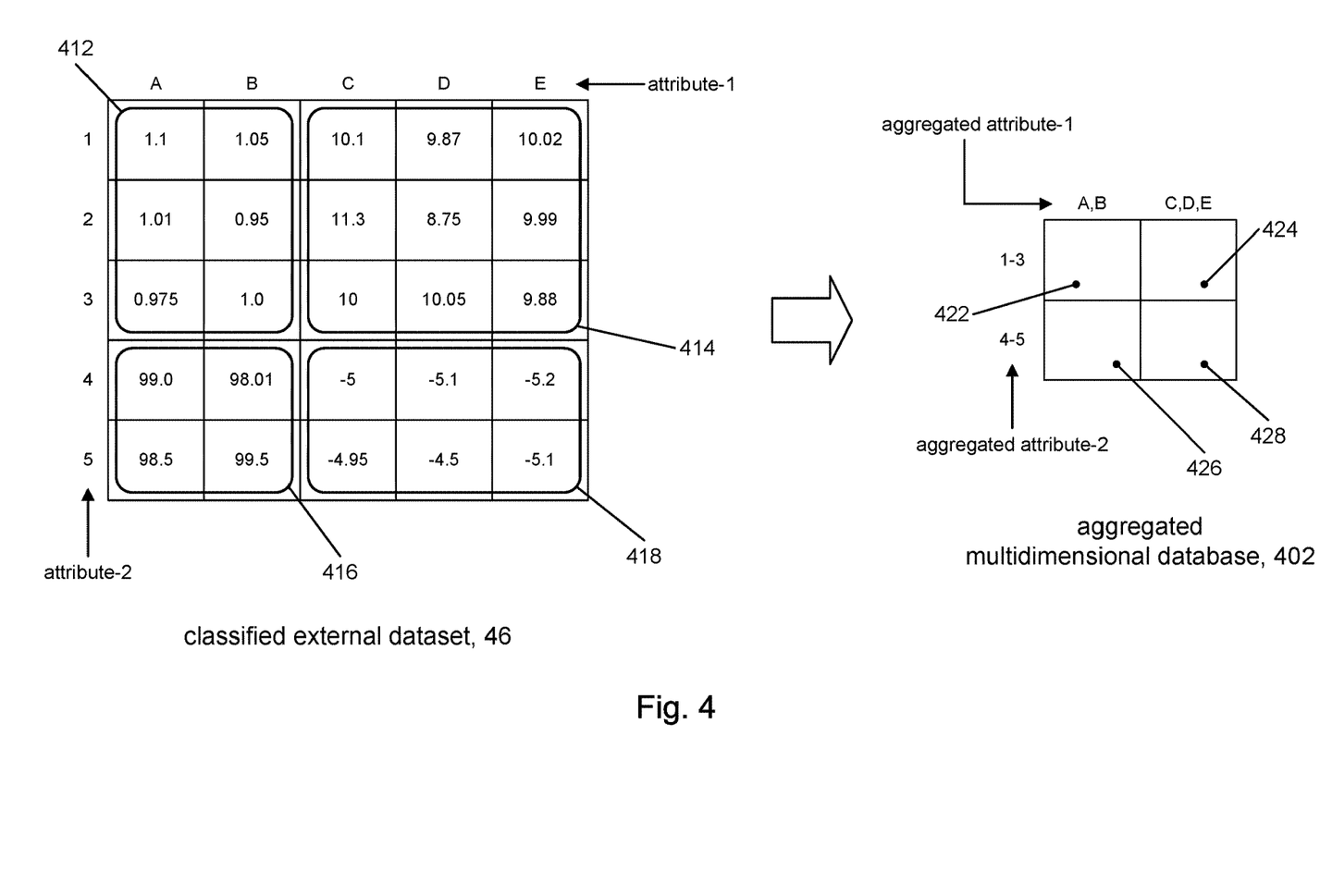
FIGS. 4 and 4A show an illustrative example of forming a multidimensional database from an external dataset in accordance with the present disclosure.

FIG. 4 shows an illustrative example of aggregation in accordance with the present disclosure. The figure shows a classified external dataset 46, and an aggregated multidimensional database 402 in accordance with the present disclosure. The external dataset 46 is "classified" in that it represents a subset of an external dataset (e.g., 16, FIG. 1) that is defined by only those attributes of the external dataset that have been identified as being relevant to a given application of the multidimensional database 402. The classified external dataset 46 is depicted merely for discussion purposes, but is not otherwise actually created. In the example depicted in FIG. 4, the attribute-1 and attribute-2 attributes represent those attributes of the external dataset that are deemed to be relevant to the multidimensional database 402. The data in each cell in the external dataset 46 is identified by the combination of the attribute-1 and attribute-2 attributes.

The multidimensional database 402 represents an aggregated version of the classified external dataset 46, generated in accordance with the present disclosure. The attributes along each dimension are aggregated. Thus, one dimension is divided into a slot for the set of attribute values {A, B} of attribute-1 and a slot for the set of attribute values {C,D,E}. Likewise, the other dimension is divided into a slot for attribute values {1-3} and a slot for attribute values {4-5} of attribute-2.

Figure 4A:
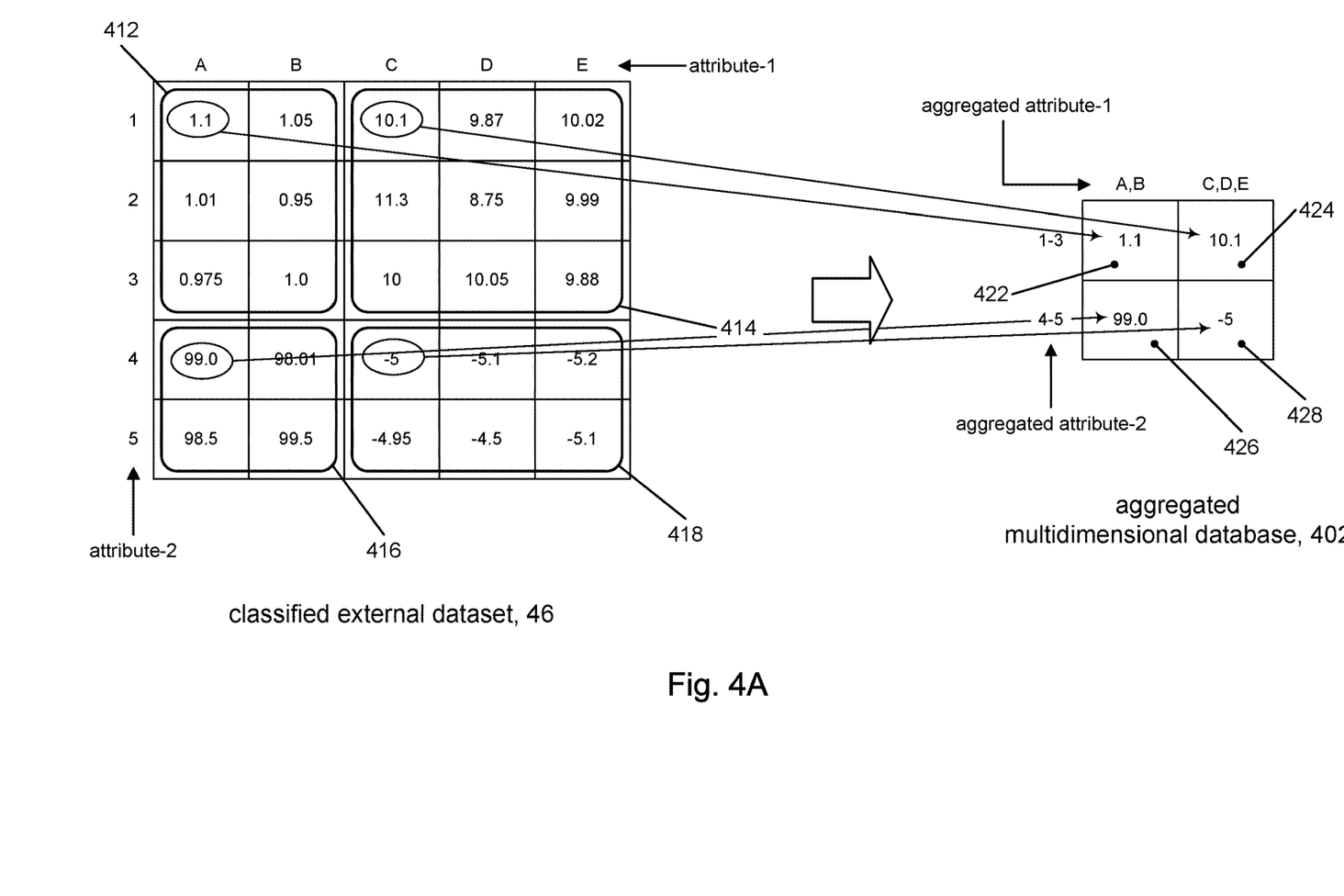

The cell data for cell 422 is obtained using an aggregation operation applied to the sets of attribute values for attribute-1 and attribute-2. The sets of attribute values associated with cell 422 are: attribute-1={A, B}; attribute-2={1-3}. These sets of attribute values identify the subset of data 412 in the classified external dataset 46. Suppose the aggregation operation is the FIRST operation, which produces the first element in the set, and that the FIRST operation is applied to attribute-1 and attribute-2; although different aggregation operations may be used for each attribute. The data for cell 422 may be determined by applying the FIRST aggregation operation to the set of attribute values {A, B} to yield the aggregated attribute value A. Likewise, applying the FIRST operation to the set of attribute values {1-3} will yield the aggregated attribute value 1. The external dataset 16 may then be queried using ("attribute-1=A" and "attribute-2=1") as the query parameters for the query. Using the example, in FIG. 4, the accessed value is 1.1, which becomes the cell data for cell 422. The cell data for cells 424, 426, and 428 may be generated in a similar way. FIG. 4A shows the result of loading the multidimensional database 402 in this way.

For comparison purposes, a conventional approach for generating the cell data for the multidimensional database 402 may involve making six separate queries to the classified external dataset 46 to produce a representative value for cell 422; nine separate queries to the classified external dataset 46 to produce a representative value for cell 424, four separate queries to the classified external dataset 46 to produce a representative value for cell 426, six separate queries to the classified external dataset 46 to produce a representative value for cell 428; a total of 25 separate queries to produce four representative values to load the multidimensional database 402 with. By comparison, loading the multidimensional database 402 in accordance with the present disclosure may involve only four separate queries to the classified external dataset 46. In a scenario with real data, the number of relevant attributes in an external dataset can be 10's to 100's or more of attributes and the number individual attribute values can be on the average of 10's to 1000's of values. If a given multidimensional database application comprises 10 attributes (dimensions) of interest and the range of attribute values averages 50 attribute values per attribute, then the number of combinations of attribute values could be on the order of $10^{50}$ (not all combinations may be possible). It can be appreciated that a conventional approach to producing representative cell data for a multidimensional database 102 (FIG. 1) can be an inordinately time-consuming task, if not impractical or even impossible.

Figure 5:
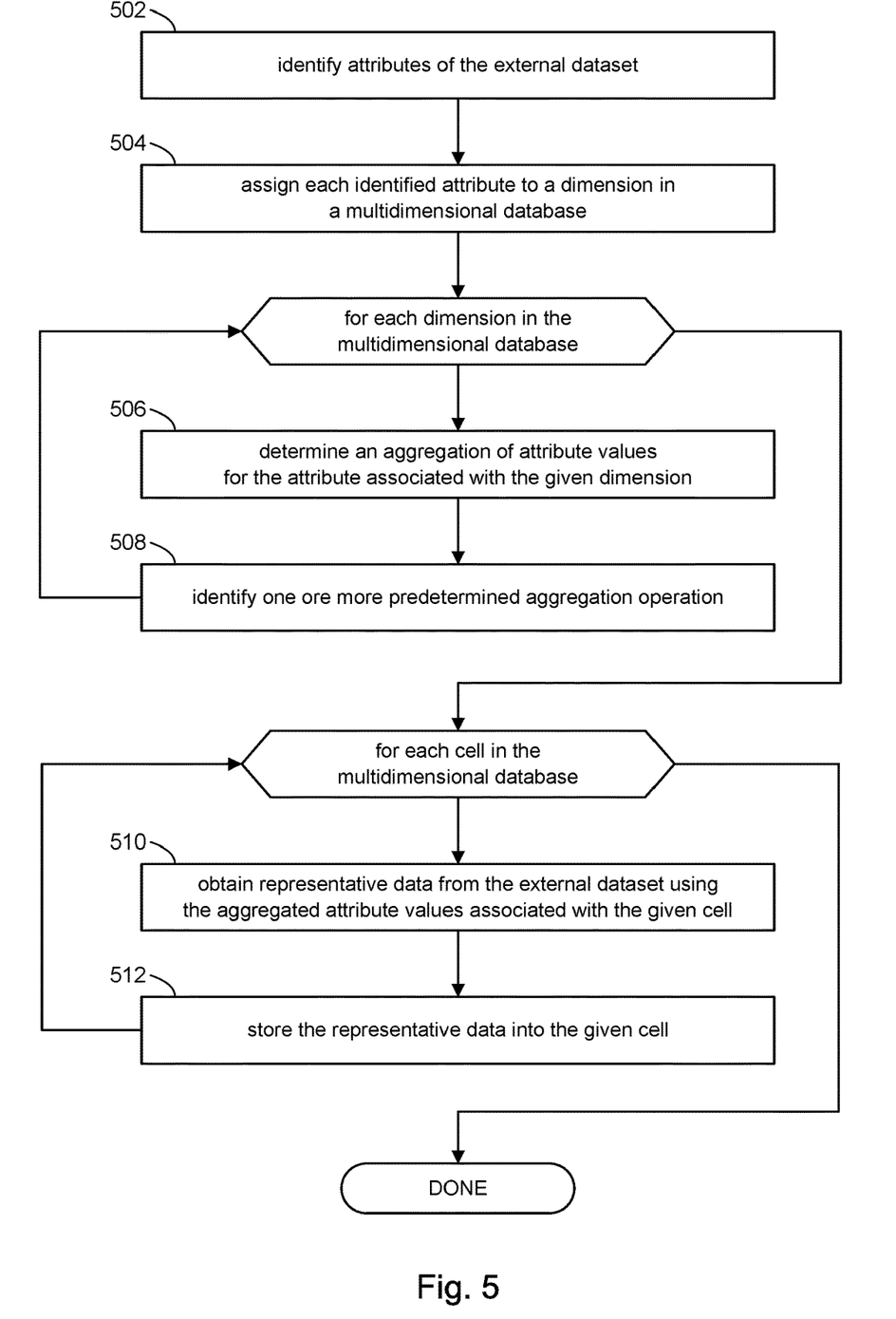
FIG. 5 represents a process to define and initially load a multidimensional database in accordance with the present disclosure.

Referring to FIG. 5, the discussion will now turn to a high-level description of heuristics for creating the multidimensional database 102 in accordance with the present disclosure. In some embodiments, for example, computer executable program code may be provided, which when executed by a computer system (e.g., 702, FIG. 7), may cause the computer system to perform processing in accordance with FIG. 5.

Classification

At block 502, a set of attributes from among the attributes in an external dataset (e.g., 16, FIG. 1) may be identified to define a multidimensional database (e.g., 102, FIG. 1). The data comprising the external dataset may be classified to identify only relevant attributes among the data in the external dataset. The multidimensional database may comprise only those attributes of the external dataset that are relevant for the given application of the multidimensional database. The criteria for selecting attributes of the external dataset may take into account the specific information needs of users who may access the multidimensional database in order to identify the relevant attributes. The criteria may come from data requirements documentation for the multidimensional database, team members who are developing the multidimensional database, and so on. The computer system may receive from a user a list of attributes in the external dataset deemed to be relevant to the purposes of the multidimensional database being created.

At block 504, the computer system may define a multidimensional database having as many dimensions as there are relevant attributes identified in block 502. The computer system may associate each of the relevant attributes identified in block 502 with a dimension of the multidimensional database. The association between the dimensions of the multidimensional database and the relevant attributes may be stored as metadata that characterize the multidimensional database.

Aggregation

At block 506, the computer system may divide each dimension in the multidimensional database into several slots along that dimension. The computer system may associate each slot along a given dimension with a set of one or more attribute values of the attribute associated with that dimension. The set of attribute values can be based on the nature of the data, which can determine which ranges of attribute values can be aggregated to one cell or which enumerations of attribute values can be aggregated to one cell in the multidimensional database. For example, suppose that the attribute is "city." The attribute values, namely cities, may be aggregated into groups based on their geographical proximity to each other, or the cities may be aggregated based on economic similarities, population densities, etc. The grouping of attribute values is intended to produce cell data that is deemed representative of the raw data in the external dataset represented by the groups of attribute values. The specific grouping of attribute values may be determined based on the nature of the data, usage patterns of the data, and the like. The grouping of attribute values may be determined by analyzing data patterns in the external dataset. Determining how to group the attribute values may require an understanding of the semantics of the data; are there specific patterns in the data, do attributes condition on each other, and so on. In some cases, an analysis of the external dataset may be conducted to find the best clusterization of the data to define the grouping of attribute values. If this is not possible (e.g., because the raw data is not available), then the aggregation of attributes may be determined based on experience with the data; for example, in the insurance or financial sector, consultants may have insight on expected behavior of the data for certain attribute combinations. The data may be sampled to look for common patterns where the data behaves as desired for certain attribute combinations, and so on.

The particular manner by which attribute values are grouped is beyond the scope of the present disclosure. For the purposes of the present disclosure, processing in block 506 may further include the computer system receiving input from the user indicative of the sets of attribute values for each relevant attribute. Thus, for example, for a first attribute, the computer system may receive from the user one or more sets of attribute values for the first attribute. Similarly for the second attribute, and so on for subsequent attributes.

At block 508, the computer system may store one or more predetermined aggregation operations to be applied to the sets of attribute values associated with the slots along the dimensions in the multidimensional database. For example, the computer system may receive from the user an aggregation operation for each of the attributes. The selection of the aggregation operations may depend on the intended usage scenarios envisioned for the multidimensional database.

Actualization

At block 510, the computer system may perform an initial load (actualization) of the multidimensional database before users can use it. In some embodiments, the computer system may obtain data from the external dataset using loader module 104 and database crawler 110 (FIG. 1). The computer system, for example, may fill the multidimensional database one cell at a time. For each cell, the computer system may generate or otherwise construct a query using the aggregated attribute values associated with the respective slots that define the cell, as described above.

The computer system may generate queries that include default values to ignore attributes in the external dataset that are not relevant to the multidimensional database. Merely to illustrate this point, suppose only products representing a certain material are relevant to the data needs of a given multidimensional database, whereas service products are not relevant. The computer system may generate queries that specify a default value of NULL for an attribute relates to service products in order to ignore service products data.

Results from the queries may include information that is not relevant to the data needs of the multidimensional database. Accordingly, the computer system may filter out or otherwise ignore irrelevant data in results received in response to queries made to the external dataset.

At block 512, the computer system may store the retrieved and filtered data into the corresponding cell of the multidimensional database. These steps can be repeated for each cell in order to load or actualize the multidimensional database. When the multidimensional database is loaded, it may then be brought online for access by users.

Various considerations may be taken into account during the initial loading of the multidimensional database:

Definition of the aggregation data parts combinations—
 The more the data is aggregated, the less data points the multidimensional database will have as cells. Thus the faster the multidimensional database is filled.

Duration of one external request to fill one data point—
 The longer the request takes, the longer it takes to filled up the multidimensional database. For example, if a request takes up to a minute, and the multidimensional database has a million cells, it could take more than 2 months to fill the database before it can be used.

Time the project can start in advance—If the project team of the application can run an initial load in advance during project implementation (which normally also takes several months), the multidimensional database can be more quickly filled up. If the database is filled from the application provider, the multidimensional database can be filled up during development, if the application is developed especially for the needs of one customer. The exact use case should be clearly identified; i.e., which dataset parts have which characteristic (query, default, result) and which aggregation is used.

Subsequent to the initial loading, the data in the multidimensional database 102 may be periodically kept up-to-date. The timeframe may be dictated by user needs, which may require updates on a daily, weekly, monthly, etc. basis. Otherwise, data in the multidimensional database 102 may become out-of-date, thus impacting the reliability and efficacy of the data. This consideration may impact how the dimensions of the multidimensional database 102 are designed in terms of the ranges or enumerations of attribute values that are associated with the slots along the dimensions.

To keep each data point in the multidimensional database 102 periodically up-to-date, a mechanism may be established to iterate over all combinations. This task falls in the area of multi-dimensional enumerative combinatorics. The iterations to generate every combination of dataset query and result attributes may be built according the rule that each cell is updated at least once in the given periodic timeframe. Consideration may need to be given to the response time of a request to the external dataset in relation to the number of combinations to fulfill the overall multidimensional database 102 update period. Data buffers may be used to provide a buffer for variations in network access time and/or to account for system downtimes, inaccessibly of the external dataset, and other delays. The logic may be expressed via the following formula:

$$\prod_{i=1}^{n} x_i \times (t_r + t_b) < T,$$

where n: number of dimensions
$x_i$: number of slots per dimension
$t_r$: response time for request to external dataset 16
$t_b$: response time of buffer access per request to external dataset 16
T: time to update the multidimensional database 102

Figure 6:
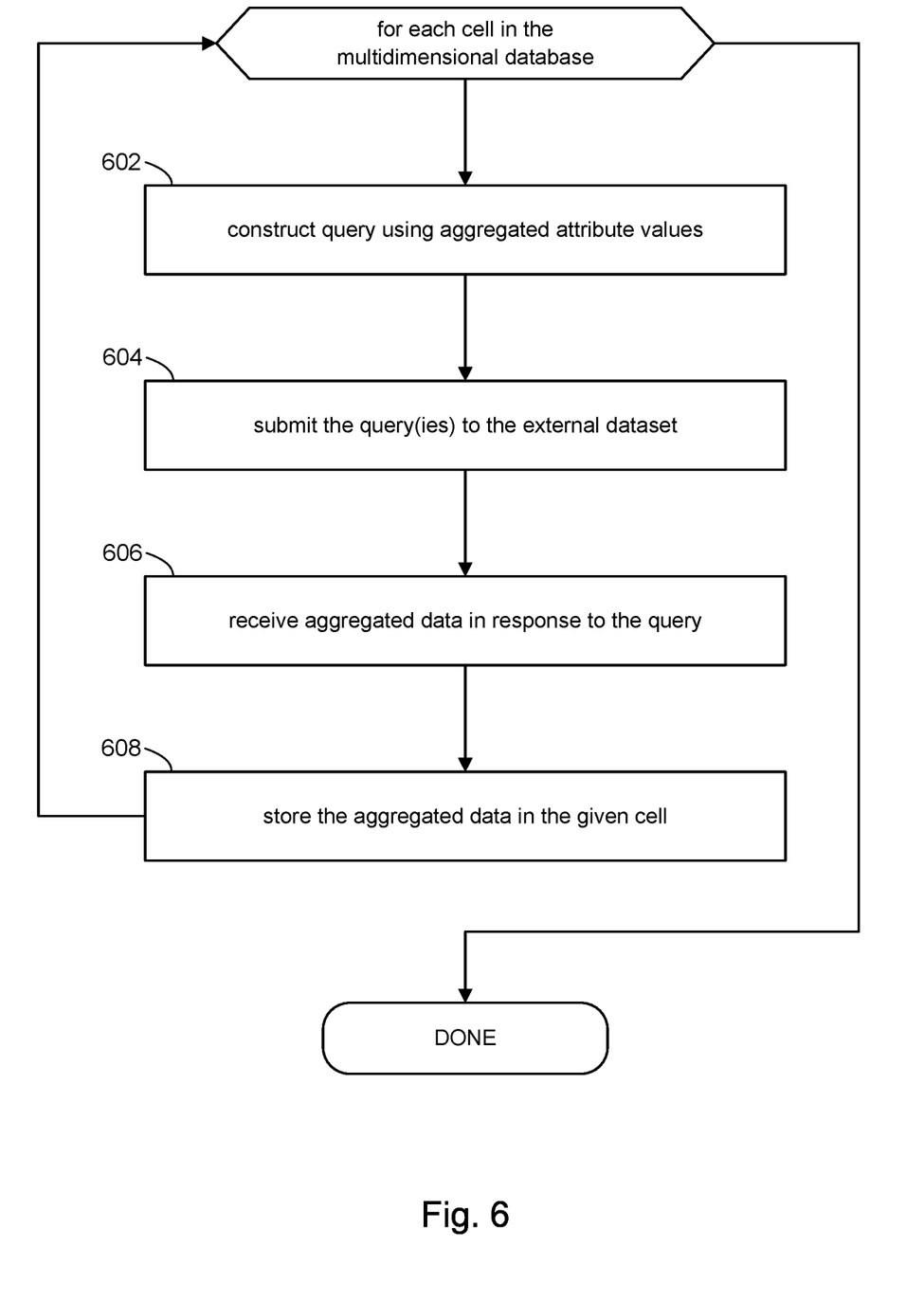
FIG. 6 represents a process to query an external dataset in accordance with the present disclosure.

Referring now to FIG. 6, the discussion will turn to a high level description of processing in accordance with some embodiments of the present disclosure to access data from the external dataset (e.g., 16, FIG. 1). In some embodiments, for example, computer executable program code may be provided, which when executed by a computer system (e.g., 702, FIG. 7), may cause the computer system to perform processing in accordance with FIG. 6.

At block 602, for each cell in the multidimensional database (e.g., 102, FIG. 1), the computer system may construct a query to access a subset of the data in the external dataset corresponding to the given cell. As explained above, cell data for a given cell generated in accordance with the present disclosure may be deemed to be representative of the data in the external dataset. The cell data that is obtained from the external dataset may be specified by the sets of attribute values associated with the given cell; more particularly, the aggregated attribute values associated with respective slots of the dimensions that define the given cell. Accordingly, the computer system may use those aggregated attribute values to build a query that specifies the subset of data in the external dataset.

Merely to illustrate this point, refer again to FIG. 4A and consider cell 428. The cell data for cell 428 may be obtained using an aggregation operation (e.g., FIRST operation) applied to the sets of attribute values for attribute-1 and attribute-2 associated with cell 428, namely attribute-1={C, D,E} attribute-2={4-5} These sets of attribute values identify the subset of data 418 in the classified external dataset 46. The data for cell 428 may be determined by applying the FIRST operation to the set of attribute values {C,D,E} to yield the aggregated attribute value C. Likewise, applying the FIRST operation to the set of attribute values {4-5} will yield the aggregated attribute value 1. The computer system may generate a single query comprising the following query parameters:

attribute-1=C; attribute-2=4

At block 604, the computer system may submit the single query generated in block 602 to the external dataset.

At block 606, the computer system may receive a response from the external dataset. The response may include the data specified in the query. The computer system may filter out or remove extraneous data that may accompany the response to obtain the desired cell data.

At block 608, the computer system may store the cell data into the given cell. This can be repeated for each cell in the multidimensional database to populate the multidimensional database with cell data.

Figure 7:
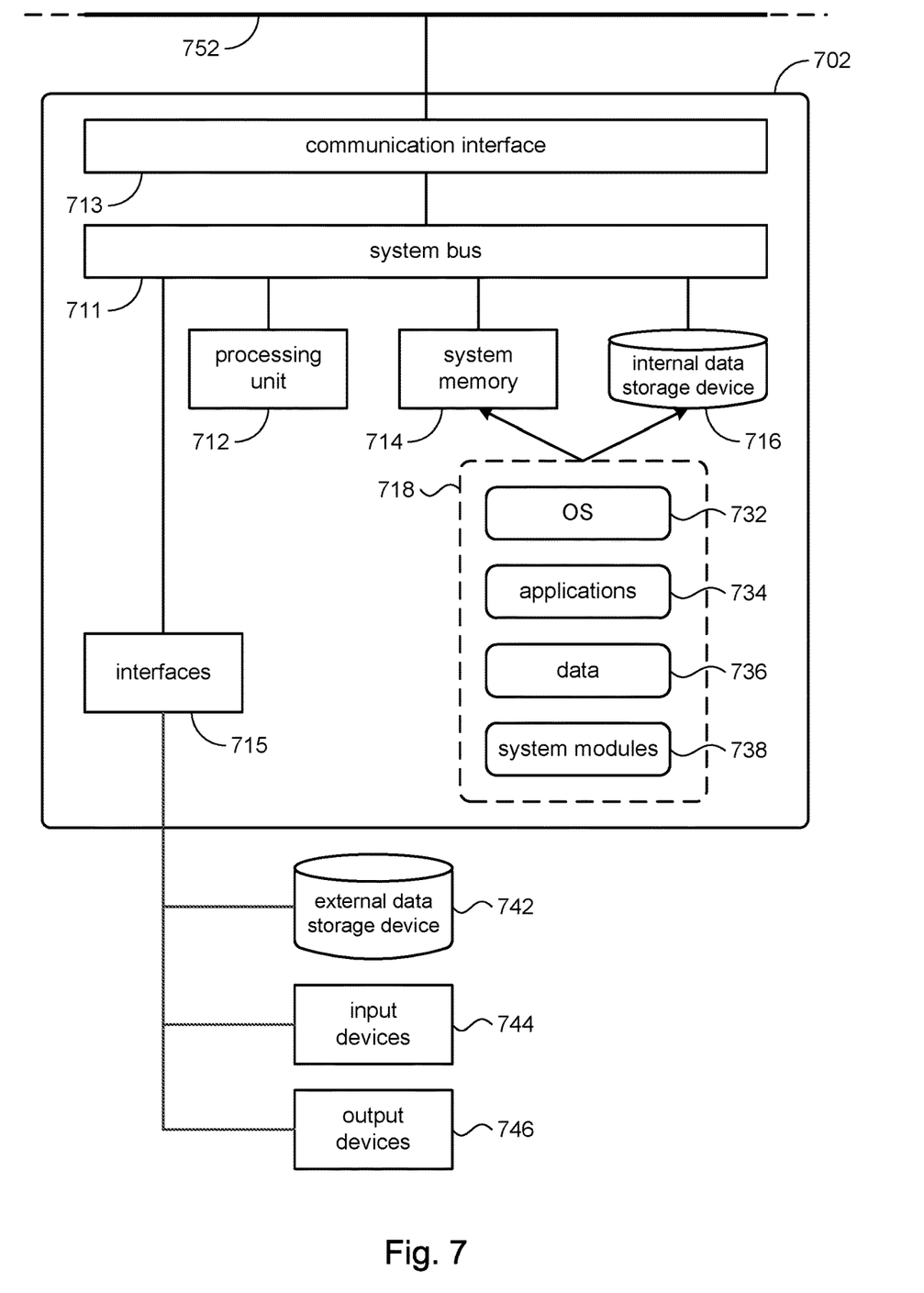
FIG. 7 represents an illustrative hardware configuration in accordance with the present disclosure.

Referring to FIG. 7, an illustrative implementation of a system to process the multidimensional database 102 in accordance with the present disclosure may include a computer system 702 having a processing unit 712, a system memory 714, and a system bus 711. The system bus 711 may connect various system components including, but not limited to, the processing unit 712, the system memory 714, an internal data storage device 716, and a communication interface 713.

The processing unit 712 may comprise a single-processor configuration, or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 716 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 714 and/or the internal data storage device 716 may store various program and data modules 718, including for example, operating system 732, one or more application programs 734, program data 736, and other program/system modules 738. The application programs 734 may comprise non-transitory computer-readable program code, and may include the loader module 104, updater module 106, and database crawler 110 shown in FIG. 1. The application programs 734, for example, which when executed, may cause the computer system 702 to perform method steps of FIG. 5 and FIG. 6.

A data storage device 742 may be connected to the computer system 702. The data storage device 742 may be used to store the multidimensional database 102. In some embodiments, the data storage device 742 may be a component in an in-memory database system, such as the Hana® in-memory database system, produced and sold by the applicant.

Access to the computer system 702 may be provided by a suitable input device 744 (e.g., keyboard, mouse, touch pad, etc.) and a suitable output device 746, (e.g., display screen). In a configuration where the computer system 702 is a mobile device, input and output may be provided by a touch sensitive display.

The computer system 702 may operate in a networked environment using logical connections via wired and/or wireless communications to one or more remote computers (not shown) over a communication network 752. The communication network 752 may be a local area network (LAN) and/or larger networks, such as a wide area network (WAN).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a database system for representing data in an external dataset, the method comprising:
providing a multidimensional database defined by a plurality of dimensions, wherein each dimension is associated with an attribute in a plurality of attributes of the data in the external dataset, the multidimensional database comprising a plurality of cells defined by a partitioning of each of the plurality of dimensions into a plurality of slots, a first cell of the plurality of cells defined by a first slot associated with a first attribute value and a second attribute value of a first attribute and by a second slot associated with a third attribute value of a second attribute;
for each of the plurality of dimensions, associating each slot along that dimension with a set of attribute values of the attribute associated with that dimension; and
generating a representation of the external dataset in the multidimensional database, wherein each cell in the multidimensional database represents a subset of the data in the external dataset, wherein for each given cell in the multidimensional database:
generating a query parameter for each dimension of the given cell by applying an aggregation operation to the set of attribute values of the attribute that is associated with the slot defining the cell along the dimension;
querying the external dataset using the query parameters for each dimension of the given cell to obtain data from the external dataset; and
storing the data into the given cell,
wherein for the querying for the first cell includes querying using the first attribute value and the third attribute value to obtain first data identifiable in the external dataset by the first attribute value and the third attribute value, and
wherein the storing for the first cell includes storing the first data identifiable in the external dataset by the first attribute value and the third attribute value into the first cell defined by the second attribute value such that the first data of the first cell is representative of different second data in the external dataset identifiable by the second attribute value.

2. The method of claim 1, further comprising aggregating each set of attribute values according to the aggregation operation to produce a corresponding aggregated attribute value.

3. The method of claim 2, wherein an aggregation operation for sets of attribute values in one dimension is different from an aggregation operation for sets of attribute values in another dimension.

4. The method of claim 1, wherein the step of accessing comprises:
making a single query to the external dataset using the plurality of aggregated attribute values as parameters of the single query; and
receiving a response comprising the data for the given cell in response to the single query.

5. The method of claim 1, wherein each slot along a given dimension is associated with a range of attribute values of the attribute associated with the given dimension.

6. The method of claim 5, wherein the range of attribute values of each slot along the given dimension spans the same number of attribute values as other slots along the given dimension.

7. The method of claim 5, wherein the range of attribute values of some slots along the given dimension span a number of attribute values different than other slots along the given dimension.

8. The method of claim 1, wherein each slot along a given dimension is associated with an enumeration of attribute values of the attribute associated with the given dimension.

9. The method of claim 8, wherein each slot along the given dimension enumerates the same number of attribute values as other slots along the given dimension.

10. The method of claim 8, wherein each slot along the given dimension enumerates a number of attribute values different than other slots along the given dimension.

11. A system comprising:
a processing unit;
a memory;
a storage unit having stored thereon a multidimensional database defined by a plurality of dimensions, wherein each dimension is associated with an attribute in a plurality of attributes of the data in the external dataset, the multidimensional database comprising a plurality of cells defined by a partitioning of each of the plurality of dimensions into a plurality of slots, wherein for each of the plurality of dimensions, each slot along that dimension is associated with a set of attribute values of the attribute associated with that dimension, a first cell of the plurality of cells defined by a first slot associated with a first attribute value and a second attribute value of a first attribute and by a second slot associated with a third attribute value of a second attribute; and
program code stored in the memory, the program code comprising executable instructions which, when executed by the processing unit, cause the processing unit to:
associate, for each of the plurality of dimensions, each slot along that dimension with a set of attribute values of the attribute associated with that dimension; and
generate a representation of the external dataset in the multidimensional database, wherein each cell in the multidimensional database represents a subset of the data in the external dataset, wherein for each given cell in the multidimensional database:
generate a query parameter for each dimension of the given cell by applying an aggregation operation to the set of attribute values of the attribute that is associated with the slot defining the cell along the dimension;
query the external dataset using the query parameters for each dimension of the given cell to obtain data from the external dataset; and
store the data into the given cell,
wherein for the querying for the first cell includes querying using the first attribute value and the third attribute value to obtain first data identifiable in the external dataset by the first attribute value and the third attribute value, and
wherein the storing for the first cell includes storing the first data identifiable in the external dataset by the first attribute value and the third attribute value into the first cell defined by the second attribute value such that the first data of the first cell is representative of different second data in the external dataset identifiable by the second attribute value.

12. The system of claim 11, wherein the executable instructions which, when executed by the processing unit, cause the processing unit to aggregate each set of attribute values according to the aggregation operation to produce a corresponding aggregated attribute value.

13. The system of claim 12, wherein an aggregation operation for sets of attribute values in one dimension is different from an aggregation operation for sets of attribute values in another dimension.

14. The system of claim 11, wherein the executable instructions which, when executed by the processing unit, cause the processing unit to access the data by:
making a single query to the external dataset using the plurality of aggregated attribute values as parameters of the single query; and
receiving a response comprising the data for the given cell in response to the single query.

15. The system of claim 11, wherein slots along a given dimension are associated with a range of attribute values of the attribute associated with the given dimension.

16. The system of claim 11, wherein slots along a given dimension are associated with an enumeration of attribute values of the attribute associated with the given dimension.

17. A non-transitory computer readable storage medium having stored thereon computer executable program code which, when executed by a computer, cause the computer to:
store a multidimensional database on a storage device, the multidimensional database defined by a plurality of dimensions, wherein each dimension is associated with an attribute in a plurality of attributes of the data in the external dataset, the multidimensional database comprising a plurality of cells defined by a partitioning of each of the plurality of dimensions into a plurality of slots, a first cell of the plurality of cells defined by a first slot associated with a first attribute value and a second attribute value of a first attribute and by a second slot associated with a third attribute value of a second attribute;
associate, for each of the plurality of dimensions, each slot along that dimension with a set of attribute values of the attribute associated with that dimension; and
generate a representation of the external dataset in the multidimensional database, wherein each cell in the multidimensional database represents a subset of the data in the external dataset, wherein for each given cell in the multidimensional database:
generate a query parameter for each dimension of the given cell by applying an aggregation operation to the set of attribute values of the attribute that is associated with the slot defining the cell along the dimension;
query the external dataset using the query parameters for each dimension of the given cell to obtain data from the external dataset; and
store the data into the given cell,
wherein for the querying for the first cell includes querying using the first attribute value and the third attribute value to obtain first data identifiable in the external dataset by the first attribute value and the third attribute value, and
wherein the storing for the first cell includes storing the first data identifiable in the external dataset by the first attribute value and the third attribute value into the first cell defined by the second attribute value such that the first data of the first cell is representative of different second data in the external dataset identifiable by the second attribute value.

18. The non-transitory computer readable storage medium of claim 17, wherein the computer executable program code which, when executed by a computer, cause the computer to aggregate each set of attribute values according to the aggregation operation to produce a corresponding aggregated attribute value.

19. The non-transitory computer readable storage medium of claim 18, wherein an aggregation operation for sets of attribute values in one dimension is different from an aggregation operation for sets of attribute values in another dimension.

20. The non-transitory computer readable storage medium of claim 17, wherein the computer executable program code which, when executed by a computer, cause the computer to access the data by:
making a single query to the external dataset using the plurality of aggregated attribute values as parameters of the single query; and
receiving a response comprising the data for the given cell in response to the single query.

* * * * *